United States Patent [19]
Fray

[11] Patent Number: 5,698,759
[45] Date of Patent: Dec. 16, 1997

[54] TREATMENT OF POLYVINYLCHLORIDE

[76] Inventor: Derek Fray, Evergreen Cottage, Kirk Deighton, Nr Wetherby, Great Britain, LS22 4DZ

[21] Appl. No.: 367,308
[22] PCT Filed: Jul. 14, 1993
[86] PCT No.: PCT/GB93/01485
§ 371 Date: Jan. 13, 1995
§ 102(e) Date: Jan. 13, 1995
[87] PCT Pub. No.: WO94/02210
PCT Pub. Date: Feb. 3, 1994

[30] Foreign Application Priority Data

Jul. 15, 1992 [GB] United Kingdom ............... 9215034

[51] Int. Cl.⁶ ............... A62D 3/00; B01D 11/00; C01G 9/00
[52] U.S. Cl. ............... 588/205; 75/353; 75/401; 588/209; 588/234; 588/236; 423/44; 423/88; 423/96; 423/107; 423/150.3
[58] Field of Search ............... 588/205, 206, 588/207, 208, 209, 213, 234, 235, 255; 585/241; 75/353, 401; 423/44, 59, 60, 75, 76, 79, 87, 96, 97, 107, 108, 133, 136, 150.3

[56] References Cited

U.S. PATENT DOCUMENTS

| 4,447,262 | 5/1984 | Gay et al. ............... 588/205 |
| 4,800,069 | 1/1989 | Fray ............... 423/97 |
| 4,855,081 | 8/1989 | Wallace ............... 588/13 |
| 5,198,018 | 3/1993 | Agarwal ............... 75/401 |
| 5,541,952 | 7/1996 | Gewge et al. ............... 379/9 |

FOREIGN PATENT DOCUMENTS

| 1001775 | 3/1990 | Belgium . |
| 1001775A6 | 3/1990 | Belgium . |
| 2033901 | 1/1972 | Germany . |
| 3443722 | 6/1986 | Germany . |
| 3443722A1 | 6/1986 | Germany ............... A62D 3/00 |
| 3615027 | 11/1987 | Germany . |
| 3615027A1 | 11/1987 | Germany ............... A62D 3/00 |

Primary Examiner—Gary P. Straub
Attorney, Agent, or Firm—Madson & Metcalf

[57] ABSTRACT

A method is described which allows two hazardous waste products, namely PVC and electric arc furnace dust, both of which have negative commercial value, to be combined to produce an iron oxide suitable for steel making and making pure cadmium lead and zinc and chlorine, all of which can be sold. The heat generated during the exothermic reaction may be used to generate electricity which may be sold or used in plants where the reaction is carded out. The method can also be used for metal scraps.

6 Claims, 4 Drawing Sheets

TREATMENT OF POLYVINYLCHLORIDE

This invention relates to a method of treating materials comprising or including polyvinylchloride (PVC), chlorinated rubber and other chlorinated polymers.

PVC, especially PVC which is contaminated with other plastics is very difficult to recycle, as on heating, the material decomposes before it melts. It is possible to dissolve PVC in organic solvents, but when other plastics are present these may also dissolve with undesirable effects. With much scrap PVC the only method of disposal is land fill. However, this can be hazardous if the PVC contains toxic metallic fragments, such as copper from PVC covered copper wire. In addition, stabilisers are frequently added to PVC and these may be salts of Sn, Pb, Cd, Zn, Ba, Ca, Cu and Na, some of which form toxic compounds when PVC is heated at elevated temperatures.

As more and more products are recycled, various residues, fluxes and drosses are formed which have no commercial value and have difficult and expensive disposal problems. It is possible to devise chemical ways for treating these materials, but invariably the cost of the reagents and the chemicals makes the processes prohibitively expensive. Furthermore, many of these waste materials have been declared hazardous, and therefore this makes their disposal even more difficult. One example of a substance which is generated and which requires recycling is electric arc furnace dust, which is generated when scrap steel is melted in an electric arc furnace. The dust contains iron oxides and quantities of zinc, lead and cadmium which makes it a toxic material. Known methods of attempting to dispose of the electric arc furnace dust have proved to be unsatisfactory, in that it is very difficult to extract all the zinc, cadmium and lead so that the remaining slags, dust etc are completely safe for disposal. The problem of disposing such materials is likely to get considerably worse in the future when car bodies that have been galvanised are recycled. According to a first aspect of the invention there is provided a method of treating PVC, chlorinated rubbers, or chlorinated polymers comprising the steps of:

combining PVC, chlorinated rubbers or chlorinated polymers at an elevated temperature with an element or compound of an element, the chloride of which element is more stable than an oxide of that element; and reacting the PVC, chlorinated rubber or chlorinated polymer with an excess of air.

Advantageously, the compound is an oxide.

The PVC, chlorinated rubber or chlorinated polymer will essentially burn in the excess air to generate carbon dioxide and water as well as hydrogen chloride and sometimes a small amount of chlorine. The hydrogen chloride will react with the element or compound of the element to form a chloride.

According to a second aspect of the invention there is provided a method of treating iron contaminated with one or more non-ferrous metals with PVC, chlorinated rubber or a chlorinated polymer, and air or oxygen, wherein the PVC, chlorinated rubber or chlorinated polymer burns the air or oxygen to produce hydrogen chloride, and wherein the non-ferrous metals react with the hydrogen chloride to form volatile chlorides.

The reaction of PVC with air gives off considerable heat and this is more than sufficient to raise the temperature of any component to about 1300° C. The heat may be used to create steam and generate electricity.

Preferably the chloride is condensed. After condensation the chloride may be purified and then electrolysed to form chlorine gas, and metal.

By means of the present invention therefore, not only is a method provided for safely processing PVC, but the method also allows for reclamation of chlorine from waste PVC and the treatment of waste metallic products.

Preferably, the PVC is combined with electric arc furnace dust or some other residue. The dust contains iron oxides and quantities of zinc, lead and cadmium. The fact that the reaction of PVC with air gives off considerable heat ensures that all components in the dust are raised to a temperature of about 1300° C. Furthermore, the presence of $ZnCl_2$ is known to catalyse dechlorination of PVC.

The excess air prevents the iron and other ferrous elements such as manganese or chromium or compounds from chlorinating as the oxides are more stable than the chlorides of these elements.

If other plastics (polymers) are present, these will also burn to generate $CO_2$, $H_2O$ and heat. In some cases, the presence of other polymers can increase the yield of hydrogen chloride.

When the chlorides are condensed, some separation may occur due to the different boiling points of the different chlorides present. After condensation, the chlorides are purified with the cadmium and lead being cemented with zinc. During electrolysis the zinc chloride will produce high purity zinc with chlorine gas.

Alternatively the PVC is burned separately in air or excess air, and the element or compound is then contacted with the PVC or with the gases produced by the combustion of the PVC in air or excess air.

By means of the present invention therefore, two hazardous waste products namely PVC and electric arc furnace dust or both of which have negative commercial value may be combined together to produce an iron oxide suitable for steel making, pure cadmium, lead and zinc and chlorine which can be sold.

The heat generated during the exothermic reaction may be used to generate electricity, which may be sold or used in plants where the reaction is carried out.

The dust may also contain calcium oxide and there is a possibility that some of the chlorine might react with the calcium oxide. However this can be prevented by adding $B_2O_3$ or $SiO_2$ to combine with the calcium oxide.

If the PVC contains fillers, such as calcium carbonate, these will remain with the iron oxide if $SiO_2$ or $B_2O_3$ is added to prevent the formation of $CaCl_2$.

The method has particular application to the recycling of scrap cars. As well as the metallic component of the cars there are several plastic materials with PVC being the predominant plastics material. Plastics, when mixed together are notoriously difficult to recycle, as some melt whilst others decompose before melting or undergo some other degradation process. The plastic waste from a scrap car always includes a small metallic fraction which makes it difficult to dispose of whilst still meeting the requirements of the various Environmental Protection Agencies. The methods of the present invention therefore provides an effective way of disposing of scrap generated from cars.

The invention will now be further described by way of example only, with reference to the accompanying diagrams where:

Figure 1:
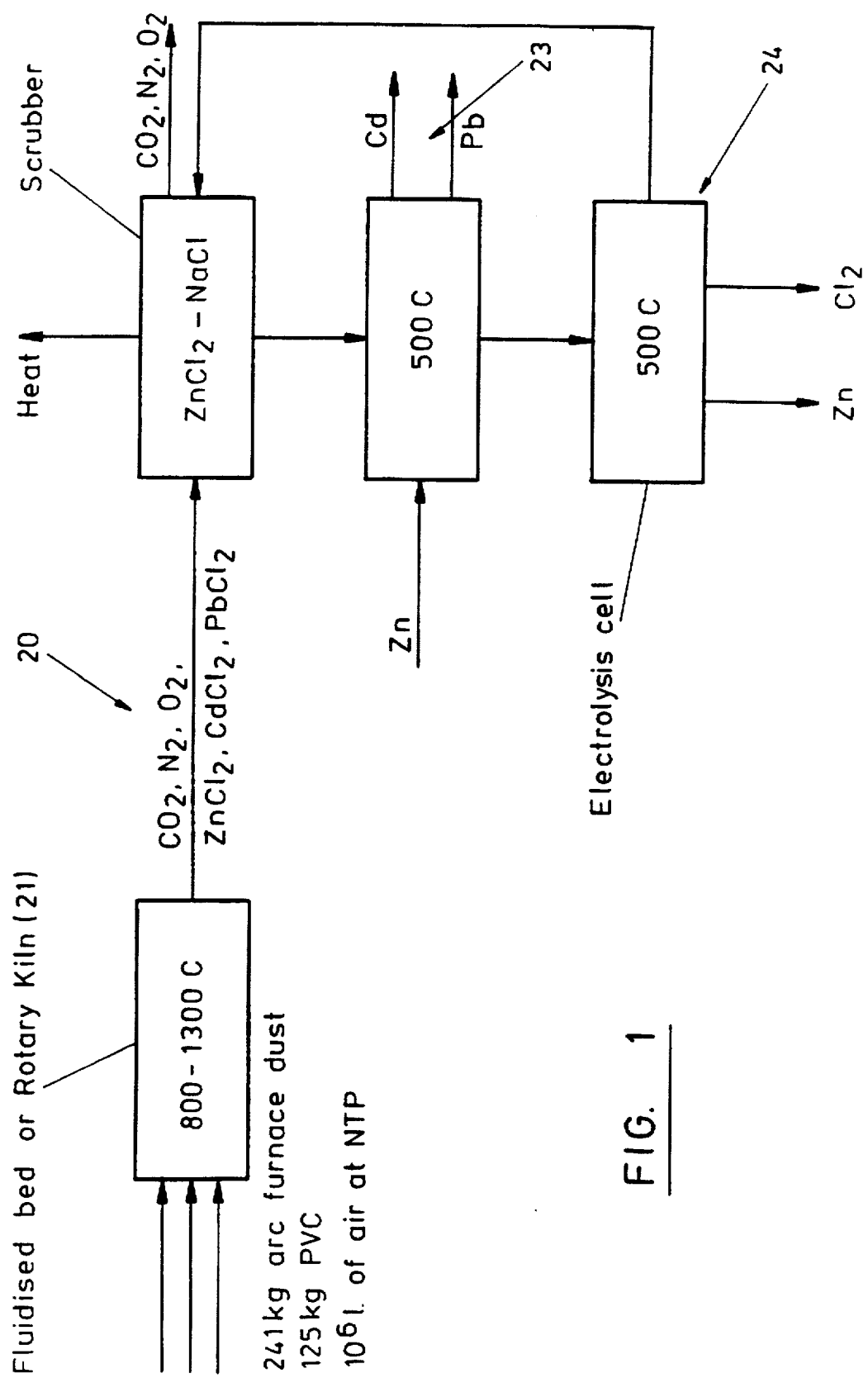
FIG. 1 is a schematic representation of a first method according to the invention, in which gases are absorbed into a fused salt.

Referring to FIG. 1 a method according to the invention is designated generally by the reference numeral 20. 241 kg of arc furnace dust, 125 kg of PVC and $10^6$ liters of air at normal temperature and pressure were mixed together in a fluidised bed or rotary kiln 21, at a temperature between 800°–1300° C. The following gases were liberated from this reaction: $CO_2$; $N_2$; $O_2$; $H_2O$; $ZnCl_2$; $CdCl_2$; and $PbCl_2$. The reaction produces chlorides which are scrubbed by a zinc chloride- sodium chloride fused salt, leaving carbon dioxide, nitrogen and oxygen. Zinc is then added to the mixture at a temperature of 500° C. as indicated at 23. This reaction produces cadmium and lead. The mixture is then electrolysed at 500° C. at 24 to produce liquid zinc and chlorine.

Figure 2:
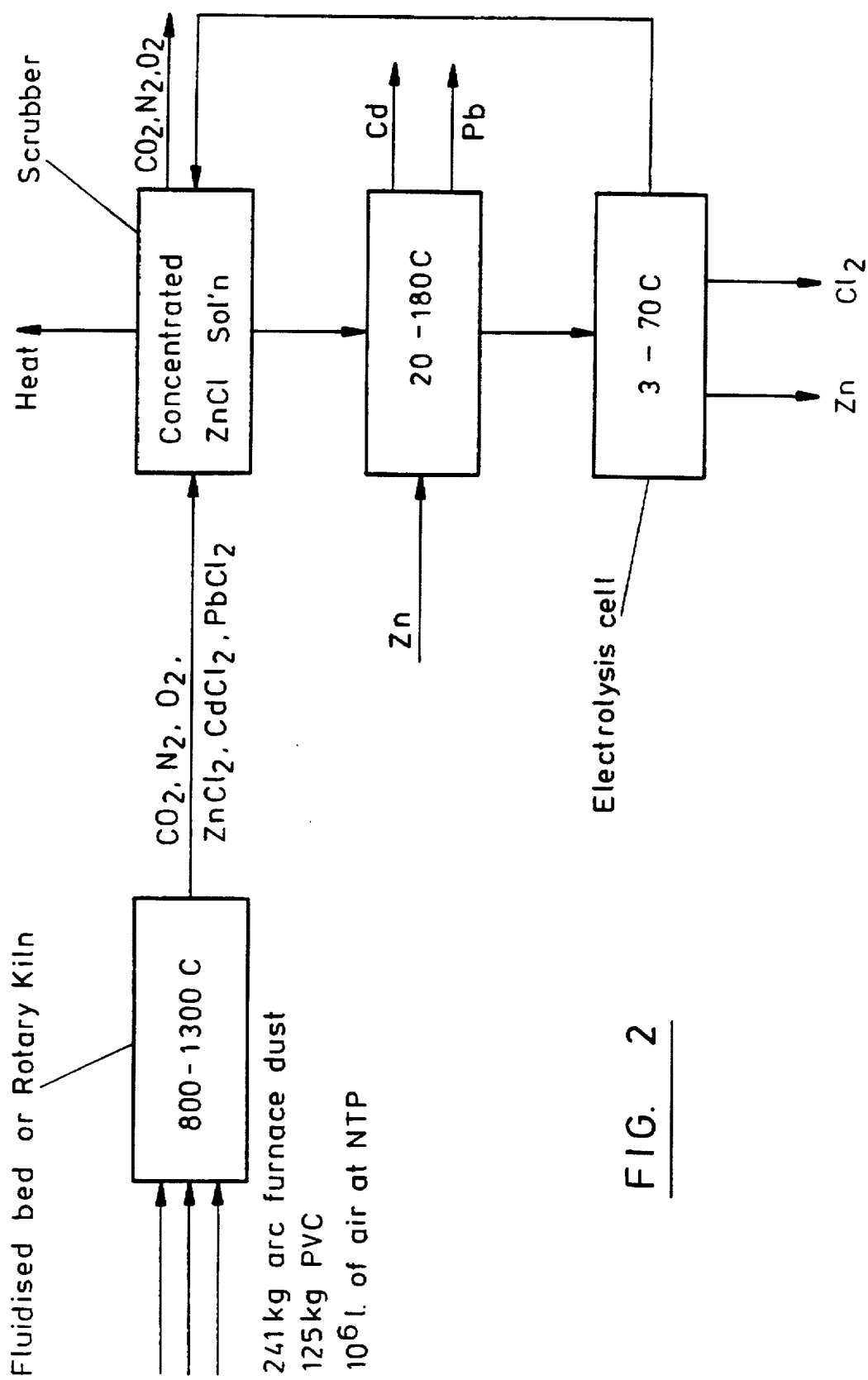
FIG. 2 is a schematic representation of a second method according to the invention in which the gases are absorbed into a concentrated salt solution.

Alternatively, as shown in FIG. 2, the chloride vapours can be scrubbed in a concentrated aqueous solution of zinc chloride, which can be purified of cadmium and lead by the addition of zinc. The purified solution can then be electrolysed to produce solid zinc and chlorine.

A laboratory experiment was carried out using a fluidised bed as follows:

The feed comprised 100 grams of iron oxide residue containing 5.4 g of zinc, 1.3 g of lead, 5 g of copper and 0.01 grams of cadmium as oxides. (90% of the zinc was present as zinc ferrite);

12 grams of PVC; and 11 liters per minute of air.

The reaction was carried out at a temperature of 825° C. for a period of 2 hours.

The residue after treatment was as follows:

80 g of iron oxide;

0.75 g of zinc; and 0.1 g of Pb, Cd and Cu.

In another laboratory experiment, 2 g of iron oxide residue was heated in air with an excess of PVC to 900° C. over 4 h. On analysis it was found that 99.9% of the zinc, lead and cadmium had been removed.

In a laboratory experiment approximately 0.5 g samples of scrap iron coated with tin were weighed out and were then placed in silica combustion boats ready to enter a furnace. The samples were then placed in the centre of the furnace.

The minimum temperature for the chlorination was decided to be 120° C., as the $SnCl_4$ goes into the vapour state at 115° C.

The scrap was analysed after chlorination to enable the amount of tin removed to be calculated. This was performed by dissolving the sample in 80 ml of aqua-regia and 100 ml of 10% tartaric acid, the solution was then made up to a known volume and analysed by atomic absorption.

Figure 3:
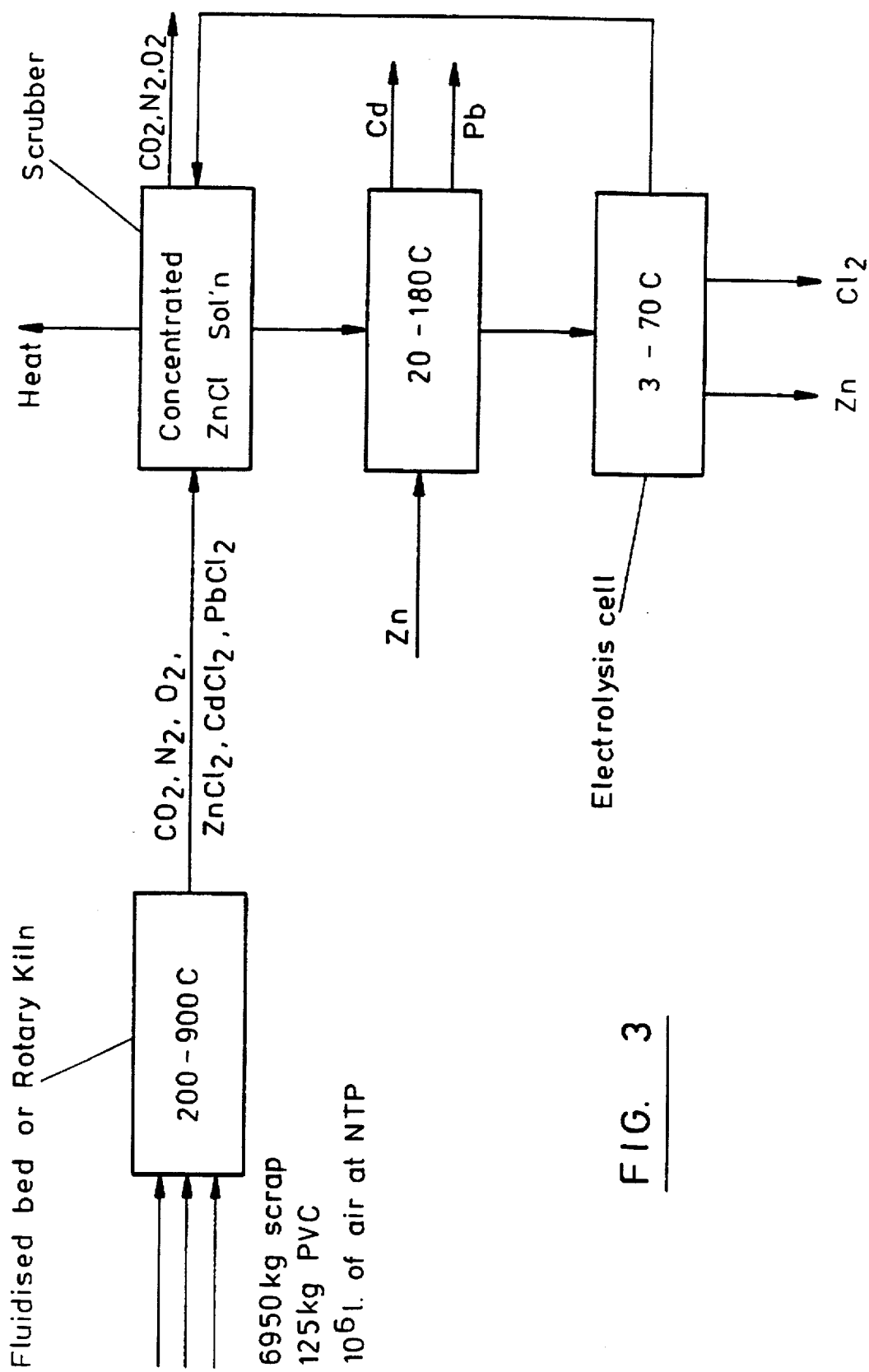
FIG. 3 is a schematic representation of a third method where the contaminated metallic scrap is treated with hydrogen chloride and air according to the present invention.

Referring to FIG. 3, a method according to the present invention is illustrated in which contaminated scrap is treated with PVC. To avoid excess production of iron oxides, the temperature of the PVC is lower than that in the methods illustrated in FIGS. 1 and 2 where electric arc furnace dust is used which already contains iron oxide.

Figure 4:
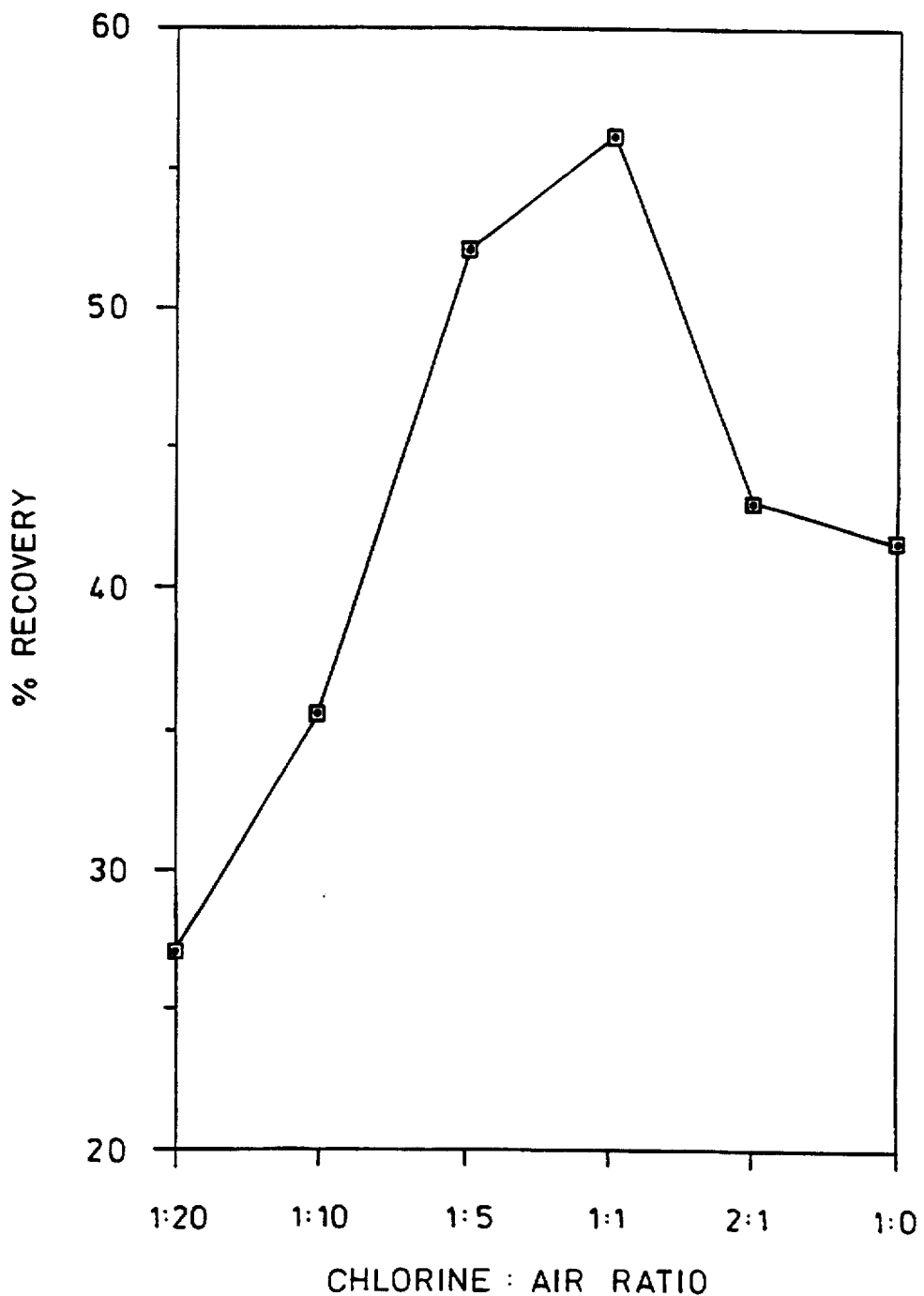
FIG. 4 is a graph illustrating the recovery of tin as a chloride in a laboratory experiment in accordance with the method of FIG. 3.

The recovery of tin as a chloride is shown in FIG. 4.

The invention has been defined in terms of PVC, but it is to be understood that the term PVC as used hereinabove includes chlorinated rubbers and chlorinated polymers.

I claim:

1. A method of treating PVC, chlorinated rubbers or chlorinated polymers comprising the steps of:

combining PVC, chlorinated rubber, or chlorinated polymer at an elevated temperature with a mixture of metals and/or metal compounds containing at least one ferrous metal value and at least one non-ferrous metal value, wherein the non-ferrous metal value is selected from zinc, lead, cadmium, copper, and tin;

reacting the PVC, chlorinated rubber, or chlorinated polymer with an excess of air or oxygen with the mixture to convert the non-ferrous metal values to volatile chlorides, to partially convert the ferrous metals to ferrous metal oxides, and to remain unchanged any ferrous metal oxides.

2. A method according to claim 1 wherein the PVC, chlorinated rubber, or chlorinated polymer is combined with electric arc furnace dust from steel making.

3. A method according to claim 1 or claim 2 further comprising the step of adding silicon oxide or boron oxide to the PVC, chlorinated rubber, or chlorinated polymers and the mixture of metals or metal compounds, which silicon oxide or boron oxide reacts with any group IIA oxide which may exist in the mixture to form a stable group IIA silicate or borate compound which will not chlorinate during the reaction.

4. A method according to claim 1 wherein the ferrous metal is iron.

5. A method of treating PVC, chlorinated rubbers or chlorinated polymers comprising the steps of:

burning PVC, chlorinated rubber, or chlorinated polymer in excess of air or oxygen to produce chlorinated combustion gases;

contacting a mixture of metals and/or metal compounds containing at least one ferrous metal value and at least one non-ferrous metal value with the chlorinated combustion gases in oxygen or excess air, wherein the non-ferrous metal value is selected from zinc, lead, cadmium, copper, and tin, and wherein the non-ferrous metal values are converted to volatile chlorides, the ferrous metals are partially converted to ferrous metal oxides, and the ferrous metal oxides remain unchanged.

6. A method of treating a feed containing one or more iron metal values contaminated with one or more non-ferrous metal values selected from zinc, lead, cadmium, copper, and tin, comprising the steps of:

combining said feed with PVC, chlorinated rubber or a chlorinated polymer, and air or oxygen in the presence of boron oxide or silicon oxide at an elevated temperature, wherein the PVC, chlorinated rubber or chlorinated polymer burns in the air or oxygen to produce hydrochloric acid; and reacting the non-ferrous metal values with the hydrochloric acid to form volatile chlorides and partially converting the ferrous metals into ferrous oxides.

* * * * *